United States Patent [19]

Ogawa et al.

[11] Patent Number: 4,632,514
[45] Date of Patent: Dec. 30, 1986

[54] COLOR LIQUID CRYSTAL DISPLAY APPARATUS

[75] Inventors: Tetsu Ogawa, Kyoto; Seiichi Nagata, Sakai; Sadayoshi Hotta, Hirakata, all of Japan

[73] Assignee: Matsushita Electric Industrial Co., Ltd., Kadoma, Japan

[21] Appl. No.: 696,170

[22] Filed: Jan. 29, 1985

[30] Foreign Application Priority Data

Jan. 31, 1984 [JP] Japan ................................. 59-16552
Jan. 31, 1984 [JP] Japan ................................. 59-16553
Jan. 31, 1984 [JP] Japan ................................. 59-16554

[51] Int. Cl.$^4$ .............................................. G02F 1/13
[52] U.S. Cl. ................................................. 350/339 F
[58] Field of Search ............... 350/339 F, 347 R, 387, 350/388, 334, 408

[56] References Cited

U.S. PATENT DOCUMENTS

| 3,804,695 | 10/1974 | Fischer | 350/334 X |
| 4,006,968 | 2/1977 | Ernstoff et al. | 350/339 F |
| 4,387,965 | 6/1983 | Hara | 350/334 X |
| 4,410,887 | 10/1983 | Stolov et al. | 350/339 F X |

FOREIGN PATENT DOCUMENTS

2137397 10/1984 United Kingdom ............ 350/339 F

OTHER PUBLICATIONS

Levenson, IBM Technical Disclosure Bulletin, "Color-Mask Plate for Color Liquid Crystal Display", Jan. 1982, vol. 24, No. 8, p. 4036.
C. H. Gooch et al, "The Optical Properties of Twisted Nematic Liquid Crystal Structures with Twist Angles 90°", J. Phys. D: Appl. Phys. vol. 8, 1975, pp. 1575 to 1585.

*Primary Examiner*—L. T. Hix
*Assistant Examiner*—Brian W. Brown
*Attorney, Agent, or Firm*—Cushman, Darby & Cushman

[57] ABSTRACT

In a color liquid crystal display apparatus of twisted nematic type, thicknesses of the liquid crystal layer is made different for different color picture elements, thereby optical rotatory dispersion which has been the cause of undesirable light transmittance at 0 voltage input is minimized, so that contrast, range of reproduced color, view angle dependency, etc. are improved, and a color liquid crystal display apparatus capable of displaying splendid picture quality is provided.

21 Claims, 30 Drawing Figures

| R | G | B | R | G | B | R | G |
|---|---|---|---|---|---|---|---|
| G | B | R | G | B | R | G | B |
| R | G | B | R | G | B | R | G |
| B | R | G | B | R | G | B | R |
| R | G | B | R | G | B | R | G |
| B | R | G | B | R | G | B | R |
| G | B | R | G | B | R | G | B |

COLOR LIQUID CRYSTAL DISPLAY APPARATUS

BACKGROUND OF THE INVENTION

1. Field of the Invention

The present invention relates to an improvement in a color liquid crystal display apparatus, and particularly concerns a color liquid crystal display apparatus having twisted nematic liquid crystal combined with a number of color filter elements.

The present invention is usable for color picture display apparatus for a television receiver set, a monitor in a videotape recorder, a view finder of a television camera or a display apparatus of a computer terminal machine.

2. Description of the Prior Art

A color fluid crystal display apparatus has such a characteristics as having small thickness, operable with low voltage power source and consumes very small power, and accordingly its market is large. Furthermore, demand is rapidly growing these years as a flat type display apparatus. Developing from the conventional monocolor type liquid crystal display apparatus, color liquid crystal display apparatuses which uses a number of color filter elements are about to be introduced into actual use.

As operation modes of such color liquid crystal display apparatus for use in color displaying, dynamic scatterinc mode (hereinafter is referred as DSM), twisted nematic mode (hereinafter is referred as TN) and guest-host mode (hereinafter is referred as GH) are considered. Among these modes, TN liquid crystal has a characteristic of small driving power, high contrast and bright display.

Now description is made on the conventional color liquid crystal display apparatus configured by a TN liquid crystal and color filter elements of red (hereinafter is referred as R), green (hereinafter is referred as G) and blue (hereinafter is referred as B).

Next, let us enter into the configuration of optical characteristic of TN liquid crystal which is an essential matter for the present invention is described.

FIG. 1 shows principle of display by transparent type TN liquid crystal display apparatus. A liquid crystal 1 of nematic type, a pair of paralelly disposed transparent substrates 2a and 2b and a liquid crystal 1 combined therebetween together constitute a liquid crystal cell, and a pair of polarizer 3a and 3b disposed with the polarizing axises in each other vertical relation are provided on the substrates 2a and 2b, respectively. A thick white arrow indicates direction of incident light and its polarization.

In the device of FIG. 1, in a 0 voltage impression state, the liquid crystal stops light as shown in FIG. 1(a). When a voltage above a threshold value (hereinafter is referred as $V_{th}$) is applied, the liquid crystal is realigned in the direction of the electric field (provided) that the dielectric constant anisotropy of the liquid crystal is positive), and incident light from the upper substrate passes through the liquid crystal apparatus. Accordingly by application or removal of voltage across the electrodes, contrast of brightness and darkness is obtainable. The above-mentioned type the liquid crystal apparatus wherein a dark state is represented at non-impression of voltage across the electrodes on both substrates is defined as "normally black" type.

In actual apparatus, transmittance T at 0 volt impression is not 0. As a result of the optical rotatory dispersion, a linearly polarized light incident to the cell changes into elliptically polarized wave light and hence passes the cell. Transmittance of parallel light incident normally to the liquid crystal cell at the 0 volt impression state is given by the following equation (C. H. Gooch, H. A. Tarry: J.Phys.D:Appl.- Phys.8,1575(1975)):

$$T = (1+u^2)^{-1} \sin^2[\theta(1+u^2)^{\frac{1}{2}}] \quad (1),$$

wherein $$u = \pi d \Delta n / \theta \lambda \quad (2),$$

wherein d is thickness of the liquid crystal layer, $\Delta n$ is defraction anisotropy of the liquid crystal, $\theta$ is twist angle of the TN liquid crystal and $\lambda$ is wavelength of incident light.

Then, by providing $\theta = \pi/2$, the value of u which satisfy T=0 of the equation (1) is given by:

$$u = \sqrt{4m - 1}, \quad (3)$$

wherein m is a positive integer.

In general, the defraction anisotropy $\Delta n$ of the liquid crystal has a dependency on the wavelength of the incident light. FIG. 2 shows the wavelength-dependency of the defraction anisotropy $\Delta n$ of a liquid crystal, for example, LIXON 9150 manufactured by Chisso Kabushiki Kaisha. FIG. 3 is a graph made by plotting for the example of d=5 μm and d=8 μm from the equation (1) by Gooch-Tarry of a spectral transmittance characteristic for 0 volt impression in a TN liquid crystal cell having the twist angle $\theta$ of 90°.

As shown in FIG. 3, the spectral transmittance characteristic shows about 10% transmittance at its peak in a visible range (400–700 nm) and can not completely stop the light. Accordingly, the cell of d=5 μm shows reddish colors and the cell of d=8 μm shows yellow colors. But the 5 μm thick cell can stop the light around the wavelength of 570 nm and the 8 μm thick cell can stop the light around 440 nm.

As shown in this actual example, when using the TN mode liquid crystal, there is problems of insufficient light stopping and resultant coloring in displaying. Apart from mono-color displaying wherein such insufficient light stopping and coloring is only little problem, these problems induce a great obstacle for full color displaying.

FIG. 4 shows a sectional view of a conventional color liquid crystal display apparatus. As shown in FIG. 4, the apparatus has a color filter having R, G and B color filter elements disposed in a matrices as shown in FIG. 5, and the apparatus has alignment films 6a and 6b formed on the inner wall of the substrate so as to control initial alignment of the liquid crystal at 0 volt impression state. Therefore by impressing a voltage above the threshold voltage $V_{th}$ across the transparent conductive film 5a and 5b, the molecular alignment of the liquid crystal is changed, so as to modulate light passing through the liquid crystal cell. Accordingly, by impressing appropriate voltages above the threshold value $V_{th}$ for respective electrodes responding to the R, G, B color filter elements of the picture elements, a full color displaying can be made by red, green and blue addition color mixing method. FIG. 6 shows one example of spectral transmittance characteristic of the color filters of R, G and B color used in this conventional apparatus. In the conventional exmaple, the problems to consider are leak and undesirable coloring of light at 0 voltage impression. Since a contrast ratio is defined as [light transmittance for bright state]/ [light transmittance for dark state], in the apparatus of the conventional configuration the existance of light leaking in the dark state, i.e., 0 volt impression state results in lowering of the contrast ratio.

In the conventional configuration where the thickness d of the liquid crystal layer is uniform for all parts of color picture elements for R, G and B, when for example d is 5 μm, in the elements of the color filters G and R the lights are almost stopped at the 0 voltage impression, while the light cannot be stopped at the elements of the B filter parts as is obvious in FIG. 3 and FIG. 6. Accordingly the apparatus shows blue or violet color as a whole at the 0 voltage impression instead of a perfect black. This phenomenon is a grave obstacle in full color displaying by the color liquid crystal display apparatus.

As can be understood from the Gooch-Tarry's equation (1), as the thickness of the liquid crystal layer increases, (e.g. above about 10 μm), the above-mentioned light leakage at 0 voltage impression decreases, and accordingly the coloring at the 0 voltage impression becomes small. However, when the thickness "d" increases, such problems are induced that elongation of response time of the liquid crystal for ON-OFF switching of the voltage impression, decrease of view angle and negative display voltage region as will be mentioned later which induces shift of color by variation of the view angle. Accordingly, such liquid crystal display apparatus becomes quite poor in color performance characteristics.

Since a color liquid crystal display apparatus using the TN mode liquid crystal is expected to have good response speed and wide view angle, the apparatus is liable to be designed with the relation between d and $\Delta n$ to fulfil $u \simeq \sqrt{3}$ for green light, namely with as short thickness d as possible. However, when such a thin liquid crystal layer is used, there is a problem that light transmittance for having wavelength of the condition apart from $u = \sqrt{3}$ becomes dominant, and then the display apparatus shows undesirable and unnatural colors.

As far as the liquid crystal layer of uniform thickness for different color parts is used, resolving of the above-mentioned various problems is impossible.

SUMMARY OF THE INVENTION

The purpose of the present invention is to provide an improved color liquid crystal display apparatus capable of disolving the above-mentioned problems of the conventional color liquid crystal display apparatus, thereby to minimize light leaking and resultant coloring of the color liquid crystal display apparatus at the 0 voltage impression and to achieve high contrast and good color performance for wide view angle of the color liquid crystal display apparatus.

The color liquid crystal display apparatus in accordance with the present invention is featured by using TN mode liquid crystal layer combined with color filter elements of R, G and B colors wherein thickness of the liquid crystal layer is varied for respective parts of different color filters.

The color liquid crystal display apparatus in accordance with the present invention comprises, a cell having two substrates forming a closed space therebetween, at least one of the two sheets being transparent, the closed space having many minute parts of different gaps, A plural of color filters of different spectral transmittance characteristics corresponding to the many minute parts of different gaps, formed on at least one of the two substrates, electrodes formed on the substrate for selective impressing of potentials across gaps of the cell, and a liquid crystal layer confined in the closed space thereby having different thicknesses corresponding to different kinds of the color filters.

DESCRIPTION OF THE PREFERRED EMBODIMENT

A color display apparatus of transparent type using a TN mode liquid crystal is described in detail.

Figure 6:
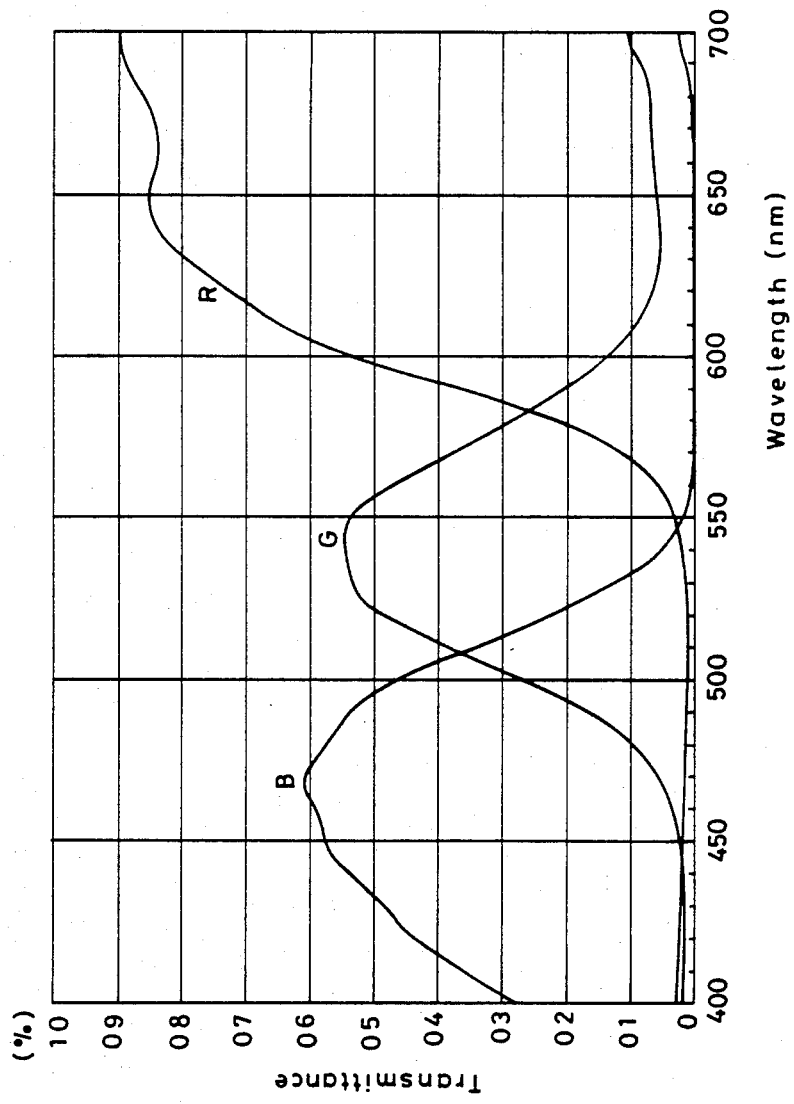
FIG. 6 is a graph showing one example of spectral distribution of transmittance of color filters of R, G and B colors used in the general color liquid crystal display device, which are also used in the present invention.
Figure 7:
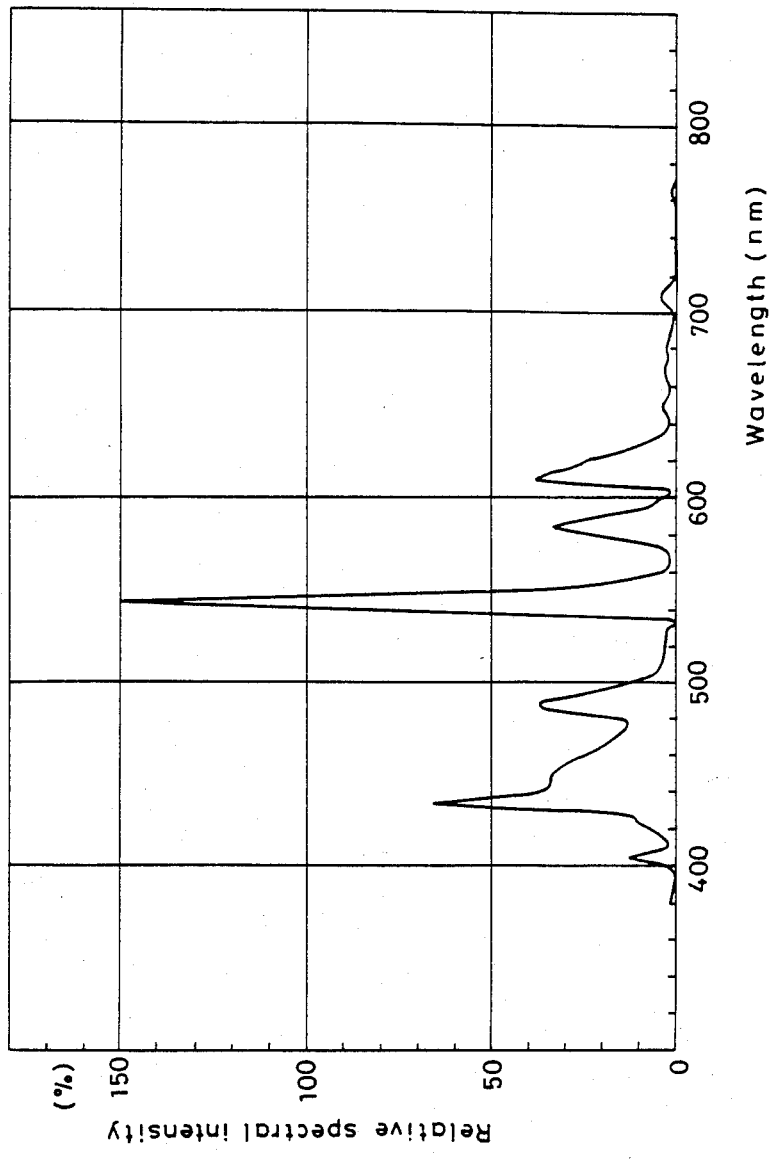
FIG. 7 is a graph showing relative spectral energy of a light of fluorescent lamp in combination with the color liquid crystal display apparatus in accordance with the present invention.

First, as the color filters of R, G and B, those having spectral distribution of transmittance as shown by FIG. 6 is used in combination with a white color fluorescent lamp having such spectral energy distribution as shown in FIG. 7 made by Matsushita Electronic Corporation and given with a trade mark PA-LOOK are selected. The spectral energies of of R, G and B light energies are represented by the wavelength of 610 nm, 545 nm and 450 nm.

As is obvious from the spectral distribution curve of the relative intensity of FIG. 7, the fluorescent lamp has a spectral characteristic of light like line spectra and give a color of light of white, and such spectral distribution of the light source is effective for the embodiment of the present invention, though the display apparatus in accordance with the present invention can be used with a continuous spectral light such as sunlight.

Figure 8:
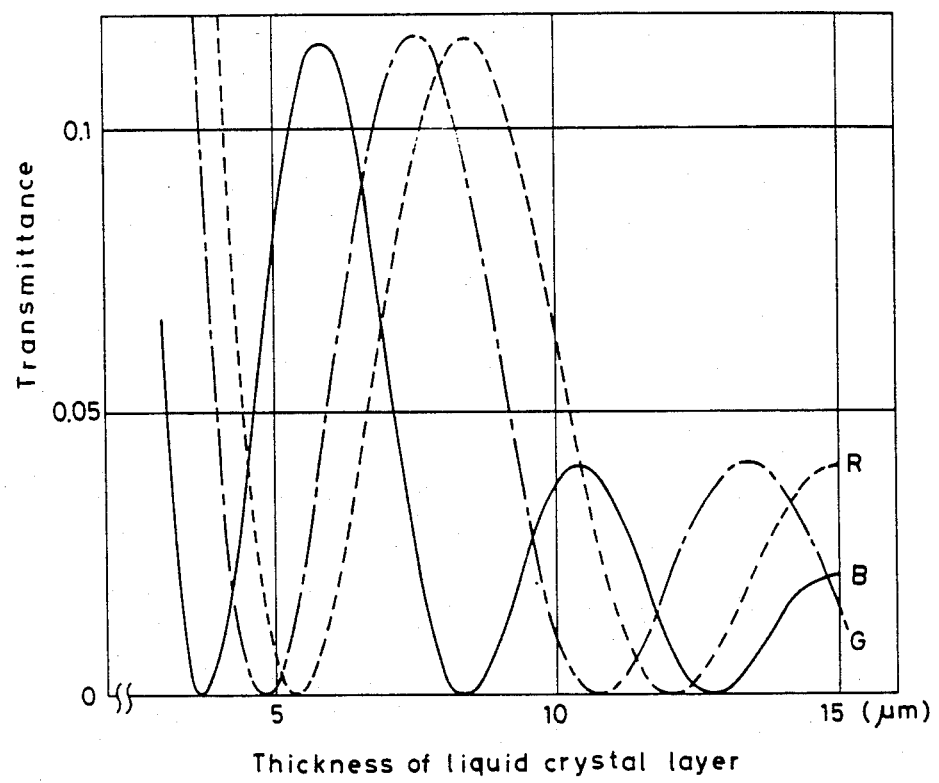
FIG. 8 is a graph showing relations of thickness d of liquid crystal layer and light transmittance for the lights of R, B and G.

As the TN mode liquid crystal, the above-mentioned LIXON 9150, for instance, is used. According to the equation (1), the wavelength of the lights R, G and B shows transmittance as shown in FIG. 8 for variation of the thickness d of the liquid crystal layer in normally black type at 0 voltage impression state. Though the left end part of the curves are omitted in FIG. 8, the curves for R, G and B monotonously increases as the thickness d nears 0, and at the thickness of d=0 μm all of the curves come to 1 of transmittance.

As is obvious from FIG. 8, the transmittance becomes 0 when the thicknesses of the liquid crystal layer are 5.4 μm, 4.8 μm and 3.7 μm for the parts of R, G and B, respectively. And at the respective thicknesses of the liquid crystal layer, the lights of R, G and B are totally stopped. That is to say, in other words, by selecting the thicknesses $d_R$, $d_G$ and $d_B$ of the liquid crystal layer for the parts corresponding to the color filter elements of R, G and B such that $d_R=5.4$ μm, $d_G=4.8$ μm and $d_B=3.7$ μm, respectively, the lights are totally stopped at 0 volt impression.

The inventors made the following experimental study.

EXPERIMENTAL STUDY 1

As has been described above, relation between the transmittance and $\Delta n$ and d of a TN liquid crystal at 0 volt impression is given by the Gooch-Tarry's equations (1) and (2). But, in the operation of image display apparatus which requires half tone displaying, the liquid crystal apparatus must be operated between a threshold voltage ($V_{th}$) and a saturation voltage ($V_{sat}$) of the TN liquid crystal, in order to obtain electrooptical characteristic of the TN liquid crystal under such low impressed voltage operation.

TABLE 1

| | Cell Thickness (μm) | | | | | | | |
|---|---|---|---|---|---|---|---|---|
| NB | 4.1 | 4.6 | 5.2 | 5.7 | 6.3 | 6.6 | 7.1 | 7.5 | 8.0 |
| NW | 4.0 | 4.6 | 5.1 | 5.7 | 6.2 | 6.6 | 7.1 | 7.6 | 8.0 |

Figure 9:
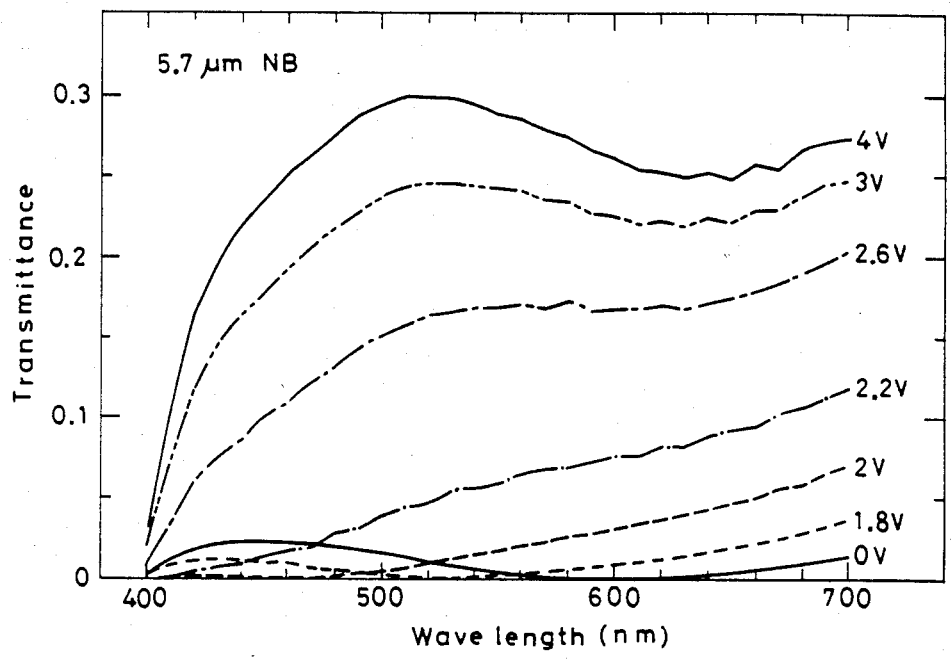
FIG. 9(a) is a graph showing spectral distribution of transmittance of light for various voltage impressions as parameters, of a normally black type color liquid crystal display apparatus.
FIG. 9(b) is a graph showing spectral distribution of transmittance of light for various voltage impression as parameters of a normally white liquid crystal display apparatus.
Figure 9:
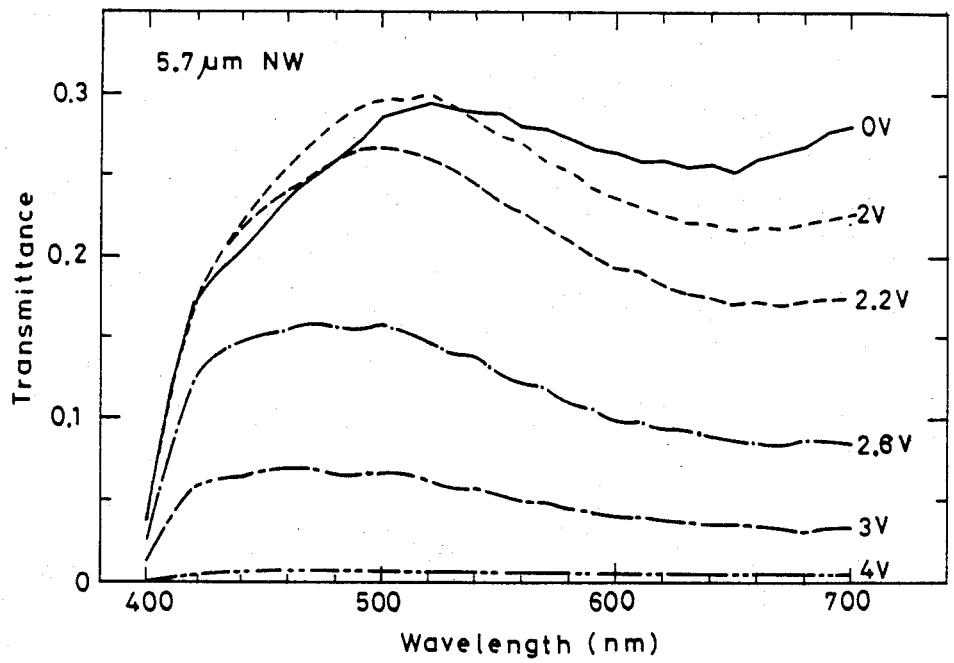

The inventors made 18 kinds of sample cells having cell thicknesses as shown in the Table 1 and of NB type and NW type. That is, the eighteen samples are divided into two kinds of groups, namely, NB type and NW type, by selecting the directions of polarizer to be provided on the substrates. And spectral transmittances of these samples are measured for various applied voltages as parameter. Experimental results of the example are shown in FIG. 9(a) and FIG. 9(b). In the NB type cell of FIG. 9(a), the condition $u=\sqrt{3}$ of the equation (3) is fulfilled at $\lambda=600$ nm, and this cell can completely cut off red light around $\lambda=600$ nm at the volt impression. On the other hand, bluish light cannot be completely cut off. (The impressed voltages are shown as parameters on the left end of the curves.) When 1.8 V which is around the threshold voltage is impressed, the wavelength which is completely cut off shifts to the shorter wavelength side, and the transmittance of the bluish light decreases. When the impressed voltage is raised, the transmittance of longer wavelength dominantly rises. By impression of a relatively high voltage close to the saturation voltage (above 3 V in the graph), at last, all lights of blue, green and red show almost uniform transmittance. Summarizing the above, at a relatively low impressed voltage (1.8 2.8 V), transmittances of red lights are predominant. On the contrary, in the NW type cell shown in the graph of FIG. 9b, decrease of transmittances of red lights occurs at a relatively low impressed voltage region. Naturally, the behaviour of the spectral transmittances of the NB type cell and NW type cell for the impressed voltages can be said in complementary relation each other.

Figure 10:
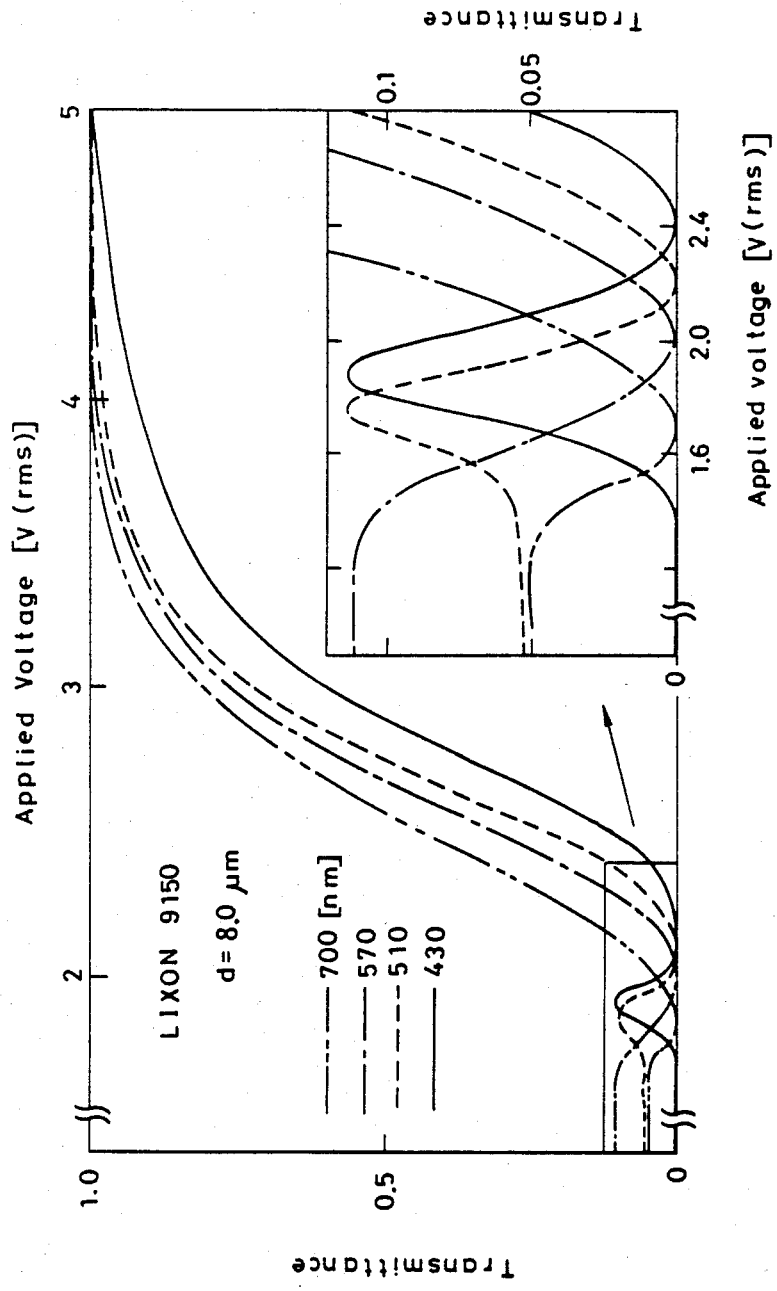
FIG. 10 is a graph showing a relation between applied voltage and transmittances of lights of various wavelengths for a thick (8.0μ) TN cell.

FIG. 10 shows response characteristics of the transmittance and applied voltage taking the wavelengths as parameters. As is obvious from FIG. 10, lights of long wavelengths show relatively high transmittances at relatively low impressed voltages. Furthermore, in the relatively thick cells, as is shown by the inserted graph showing the left end parts of the curves enlarged, there is a undesirable phenomenon that the transmittance decreases as impressed voltage increases around the threshold voltage $V_{th}$. When this phenomenon is considered in the view point of the image displaying, this phenomenon will cause undesirable inversion of brightness of the image at the range of such low impressed voltages.

Figure 11:
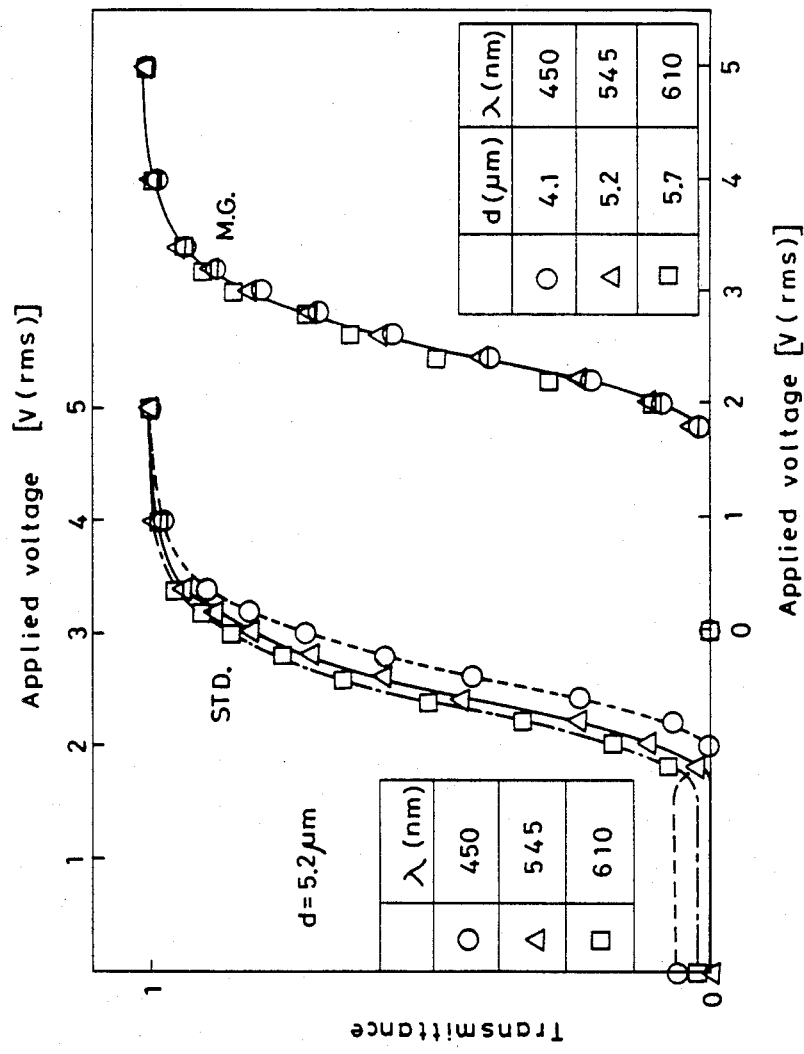
FIG. 11 is a graph showing characteristic curves of relations between applied voltage and transmittance of lights of different wavelengths of the color liquid crystal display apparatus embodying the present invention shown by a curve "MG" and a comparison example shown by curves "STD".

FIG. 11 shows another example of dependency of light transmittance on impressed voltage. In the graph, the curves of a group STD shows the transmittance of a cell having 5.2 μm thickness liquid crystal layer, and the three curves correspond to the lights of the wavelengths of 610 nm, 45 nm and 450 nm. As shown by the curves, the relation between the transmittance and impressed voltage depends on the wavelengths is not uniquely defined by the impressed voltage. On the other hand, the curves designated by MG show light transmittances of the cells having 4,1, 5.2 and 5.7 μm thick for lights having the wavelengths of 450 nm, 545 nm and 610 nm, respectively. From the comparison experimental results shown in FIG. 11, a fact is shown that, by providing liquid crystal layer with plural thicknesses for each wavelengths of light in selected appropriate way, the changes of transmittance for representative lights become in monotonous change from the 0 transmittance to saturated transmittance, and that undesirable wavelength-dependency of the transmittance is eliminated.

Under the condition that spectrum-analyzed parallel light obtained by a spectroscope is incident on the principal face of the TN liquid crystal cell under 0 volt impression, the transmittance shows good agreement with the value expected from the Gooch-Tarry's equation. Furthermore, it is confirmed that at a relatively low voltage impression, transmittance of light of longer wavelength always predominant as illustrated in FIG. 9(a) and FIG. 10. As is obvious from the curve group MG of FIG. 11, when the liquid crystal layer depth is selected to meet with the wavelength of light, the transmittance light can be changed monotonously from 0 to saturation value and the wavelength dependency of the transmittance can be eliminated.

Next, spectral transmittances of the liquid crystal cells embodying the present invention wherein liquid crystal layer thicknesses are selected $d_R=5.4$ μm, $d_G=4.8$ μm and $d_B=4.0$ μm for the parts of the color filters of R, G and B, respectively for 0 voltage impression are calculated by the below mentioned equation (4):

$$T_{MG}=\tfrac{1}{3}\{G(d_R)\cdot T_{FR}+G(d_G)\cdot T_{FG}+G(d_B)\cdot T_{FB}\} \qquad (4).$$

As a comparison example, transmittance of the liquid crystal cell having a uniform liquid crystal layer thickness at 0 volt impression is calculated by the below mentioned equation (5).

$$T_{STD}=\tfrac{1}{3}G(d_G)\cdot(T_{FR}+T_{FG}+T_{FB}) \qquad (5),$$

wherein $$G(d_R)=\sin^2\{\theta(1+u^2)^{\frac{1}{2}}\}/(1+u^2) \qquad (6),$$

$$u=\pi\cdot\Delta n(\lambda)\cdot d_R/\theta\cdot\lambda \qquad (7).$$

Figure 12:
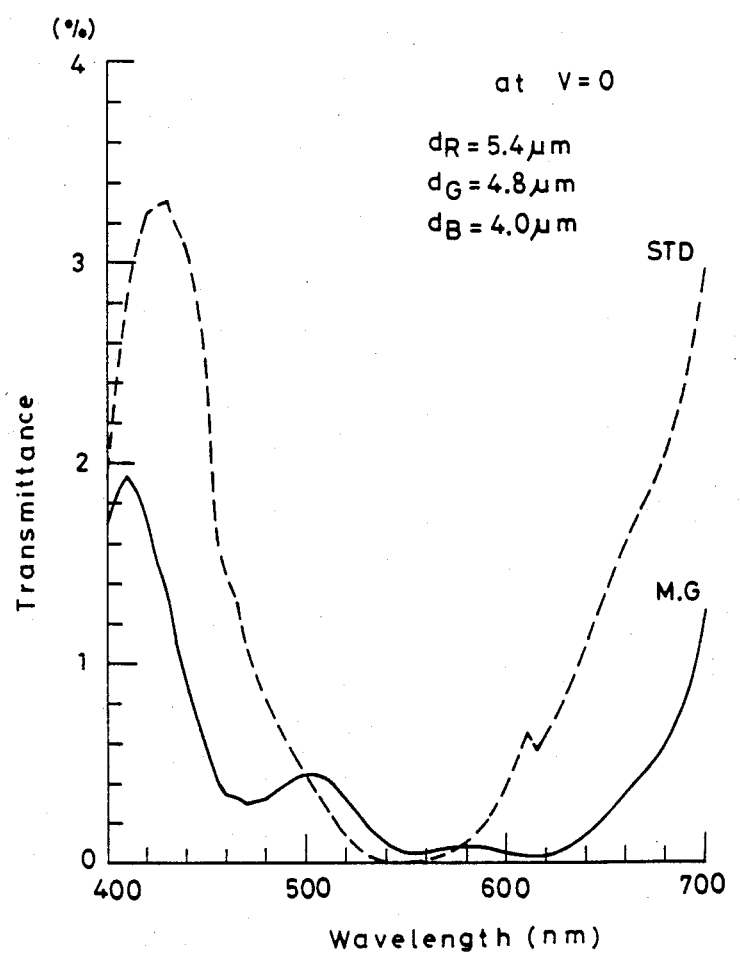
FIG. 12 is a graph showing spectral distribution of transmittance for 0 voltage impression for the color liquid crystal display apparatus embodying the present invention and the comparison example of the prior art.

The equations (4) and (5) are made by substituting $d=d_R$ and $\Delta n=\Delta n(\lambda)$ into the equation (1) considering wavelength dispersion of birefringence anisotropy of the liquid crystal used. $T_{FR}$ is spectral transmittance of red filter as illustrated in FIG. 6. Of course, R, G and B represent red, green and blue color. FIG. 12 shows result of the calculation, wherein curve MG shows the results of the multi-gap liquid crystal cell embodying the present invention calculated by equation (4), and the curve STD shows the result of the comparison example of the conventional apparatus calculated by the equation (5). As is obvious from the curves of FIG. 12, in the conventional cell of the uniform liquid crystal layer thickness d shows transmittance of 0 under the condition of $u=\sqrt{3}$, which is for green light. But the transmittances for the lights of red and blue cannot be made zero. On the contrary, in the multi-gap type liquid crystal cell of the curve MG, the transmittances can be made very small for wide range of the wavelength, and therefore the cell can be seen substantially black as a whole when the impressed voltage is 0.

EXPERIMENTAL STUDY 2

Figure 13:
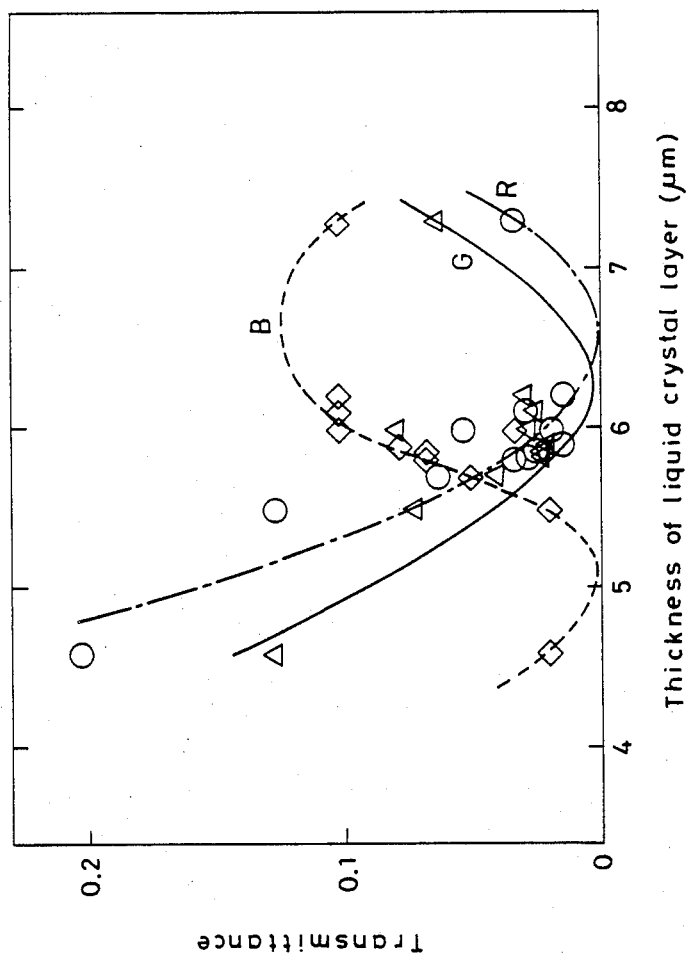
FIG. 13 is a graph showing the relation between thickness of liquid crystal layer and transmittance for R, G and B lights at 0 voltage impression for diffused light illumination.

Light transmittances of NB cells illuminated by white scatter light at 0 volt impression is normalized by the transmittance of the same cell at the impression of saturation voltage, and the normalized transmittances are plotted for thickness of liquid crystal layer as shown in FIG. 13. As is obvious from this graph, in this case, different dependencies on liquid crystal layer thickness are observed for blue light (B), green light (G) and red light (R). The nature is analogous to the thickness dependency of the transmittance expected from the Gooch-Tarry's equation in qualitative aspect. When the liquid crystal cell is illuminated by scattered light, the relation between minimum transmittance wavelength ($\lambda_{min}$) vs cell thickness (d) of an NB cell is different from the results of the Gooch-Tarry's equation (1). This is elucidated.

Figure 14:
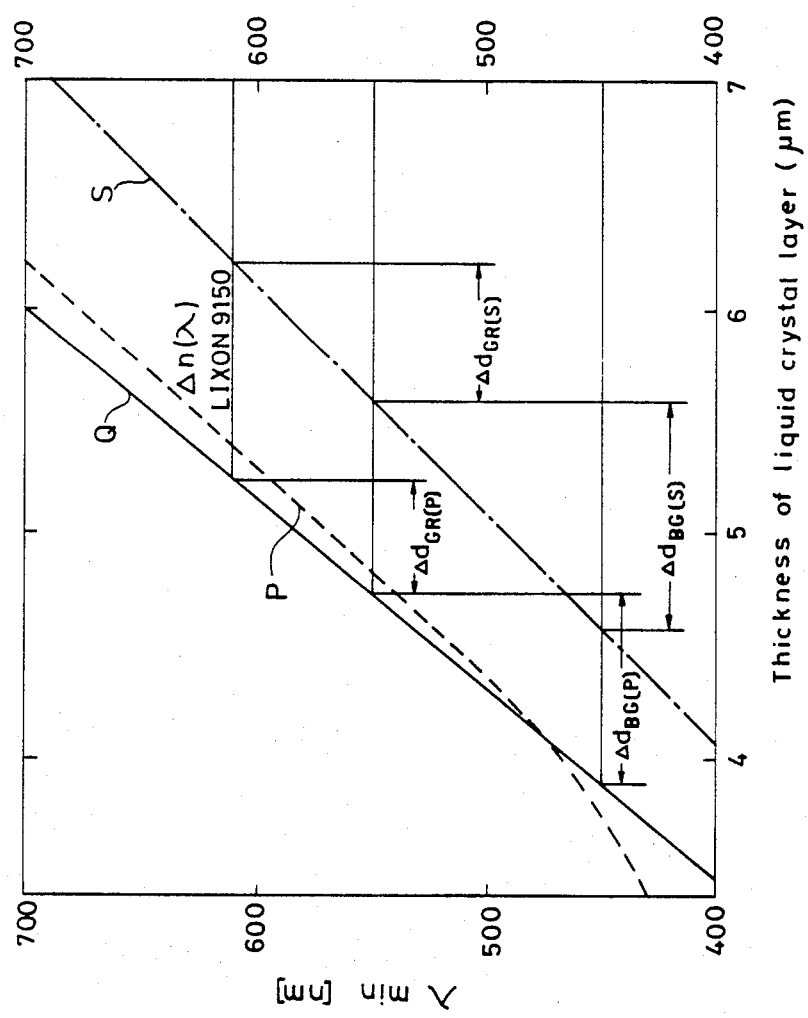
FIG. 14 is a graph showing relation between thickness of liquid crystal layer and wavelength of minimum transmittance at 0 voltage impression for parallel light illumination and diffused light illumination.

In FIG. 14, the dotted line curve P shows a calculation result induced from the equation (1) by taking account of dependency on defractive index of the liquid crystal. A straight line Q shows a calculation result induced from the equation (1) by setting $\Delta n$ equal 0.1. When the cell is vertically aluminated by a parallel light, measurement result of the $\lambda_{min}$ shows good agreement with these calculated results. On the other hand, a chain line S of FIG. 14 shows average values of distribution of $\lambda_{min}$ when the liquid crystal cell is illuminated by scatter light. Inventors' many experiments showed that the result points distribute with a width of the gap between the curve P and the chain line S around this chain line S.

Since the liquid crystal display apparatus is usually used by being illuminated with scatter light rather than parallel light, the liquid crystal layer thickness d of the display apparatus is preferred to be designed from the value shown by the chain line S. Accordingly, as shown by the summary of the invention, as a measure to make differences in the liquid crystal layer thickness, such a configuration of forming terraced surfaces on at least one of substrate which constitutes the liquid crystal cell is adopted. Once central wavelengths of three colors are decided, gaps between terraced surfaces on the parts of the filter elements of blue and green and the difference for green and red parts, namely $\Delta d_{GB}$ and $\Delta d_{GR}$, can be easily obtained from FIG. 14. As is obvious from FIG. 14, optimum terraced surface gap for the case of parallel light illumination ($\Delta d_{BG(P)}$, $\Delta d_{GR(P)}$) and optimum terraced surface gap for the scatter light illumination ($\Delta d_{BG(S)}$, $\Delta d_{GR(S)}$) show almost analogous values.

Though it is preferable that the terraced surface gap is strictly designed and so worked in manufacturing, this does not necessarily requires very strict limitation. That is, if the relations of the terraced surface gaps are made to correspond to relation of wavelength of the central lights of the filter elements, the technical advantages of the present invention is effectively performed in comparison with the conventional liquid crystal color display apparatus having a uniform liquid crystal layer.

EMBODIMENT 1

Figure 15:
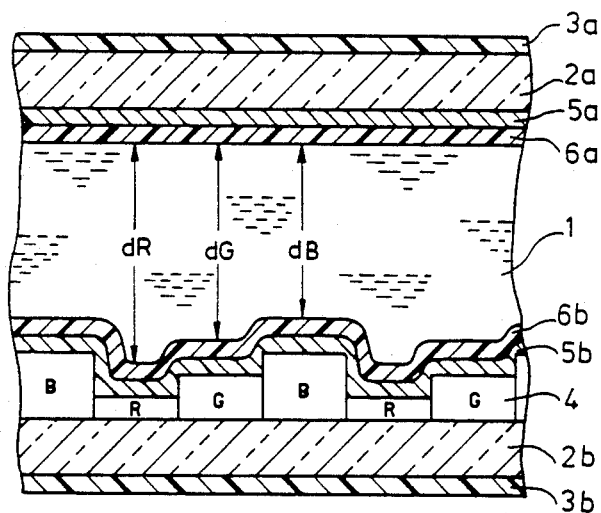
FIG. 15 is a sectional side view for schematically showing cross section of a color liquid crystal display apparatus embodying the present invention, provided with plural thicknesses of liquid crystal layer for the parts of different color filter elements by changing thicknesses of color filters.

A first example of a concrete configuration of the color liquid crystal display apparatus in accordance with the present invention is shown in a sectional side view FIG. 15 showing the cross section of a part of the apparatus. As shown in FIG. 15, the color liquid crystal display apparatus comprising a cell having two substrates 2a and 2b disposed in parallel with a predetermined gap inbetween thereby forming a closed space the substrates 2a and 2b, which have poralizer layer 3a and 3b attached on outer surface thereof, respectively. The substrates 2a and 2b further have transparent conductive films 5a and 5b and further have alignment film 6a and 6b, respectively. In this first embodiment, color filter layer 4 is formed on the transparent substrate 2b and under the transparent conductive film 5b. The color filter layer 4 has different thicknesses for R part, G part and B part. Forming of the above-mentioned liquid crystal layer thicknesses $d_R$, $d_G$ and $d_B$ to be 5.4 $\mu$m, 4.8 $\mu$m and 3.7 $\mu$m, respectively, for instance, the thicknesses are selected such as the R part of the color filter layer to be 1 $\mu$m, and the G part of the color filter part to be 1.6 $\mu$m and the B part of the color filter layer to be 2.7 $\mu$m.

As other method to form the color filter 4 of a predetermined pattern, a known process such as three time repetitions of coating of organic material containing gelatin as host material and containing a color dye is used. As other method, screen printing, vapour deposition of pigments and electrolyte coating, etc. may be used.

After forming the color filter 4 having several thicknesses, the transparent conductive film 5b made of, for instance, $In_2O_3$ of $SnO_2$ are formed and the alignment film 6b is formed. As the alignment film 6b, usually such organic material as polyimide or polyvinylalcohol is coated by spinner process or printing, followed by surface lapping. As other method, an oblique vapour deposition of SiO film may be used. Then by assembling the first substrate 2a and the second substrate 2b in a manner that the gap $d_B$ becomes 3.7 $\mu$m, then $d_G$ and $d_R$ are automatically made 4.8 $\mu$m and 5.4 $\mu$m, respectively. And a TN liquid crystal 1 is filled in the space formed by the first substrate 2a and the second substrate 2b. The poralizer 3a and 3b are disposed in a manner that the poralization axis becomes each other parallel and also parallel to the wrapping direction of the alignment film 6a and 6b.

EMBODIMENT 2

Figure 16:
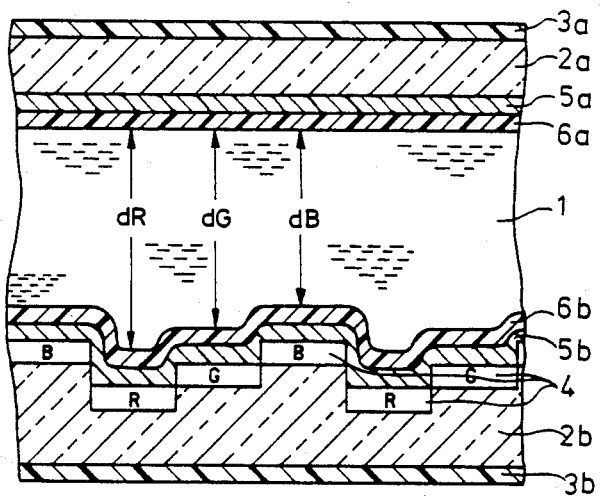
FIG. 16 is a sectional side view schematically showing cross section of a color liquid crystal display apparatus embodying the present invention wherein liquid crystal layers have plural thicknesses formed by changing thicknesses of a substrate.

A second example which has another concrete configuration is described with reference to FIG. 16.

Figure 1A:
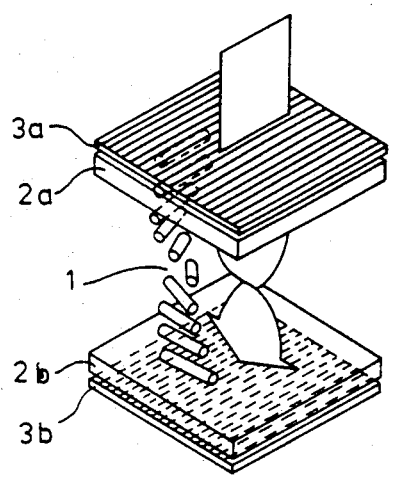
FIG. 1(a) is the perspective view showing a 0 voltage impression state of a normally black type TN liquid crystal display apparatus.
Figure 1B:
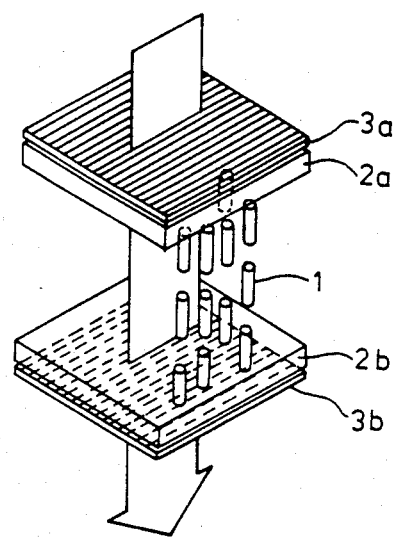
FIG. 1(b) is the perspective view of the liquid crystal display apparatus of FIG. 1(a) at a full voltage impression state.
Figure 2:
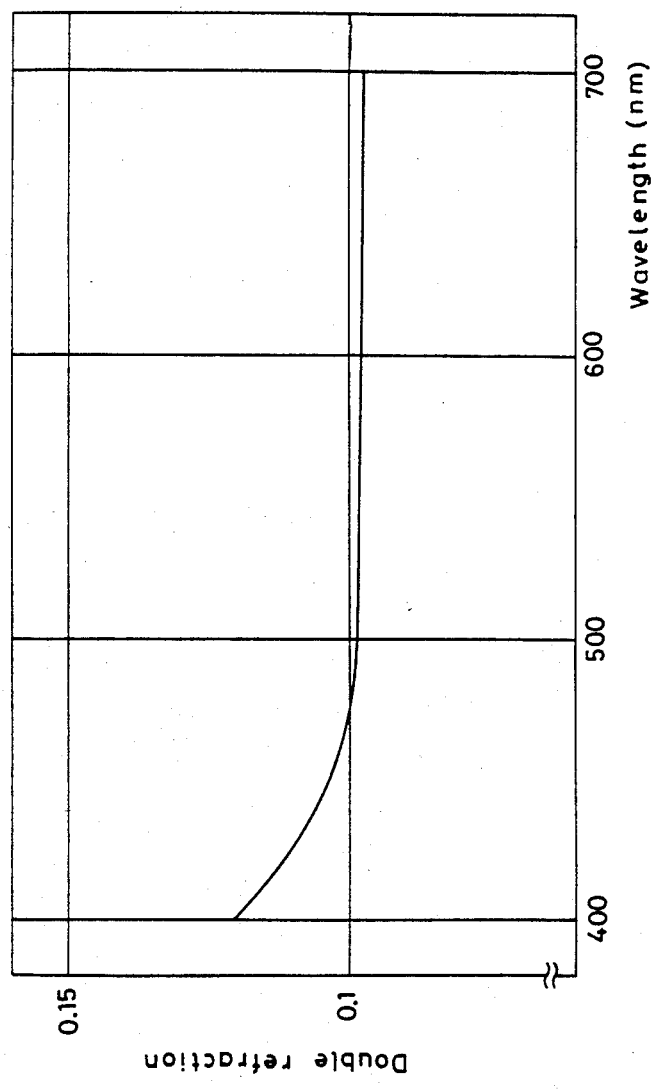
FIG. 2 is a graph showing spectral distribution of $\Delta n$ of double refraction.
Figure 3:
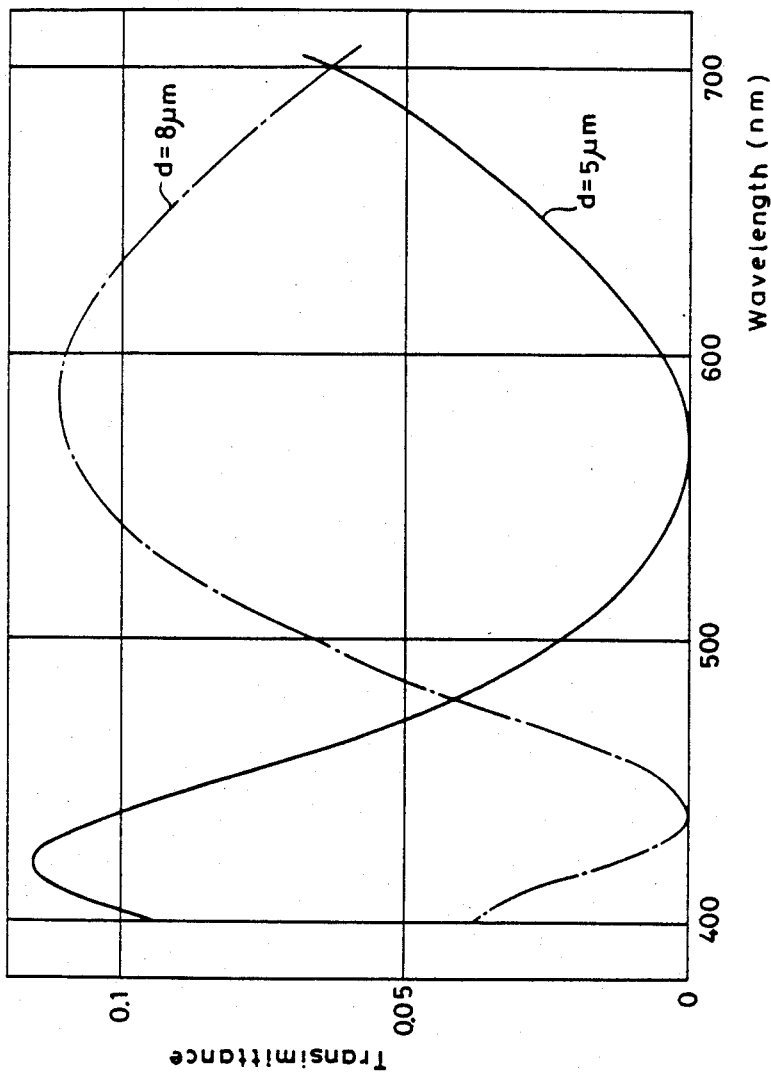
FIG. 3 is the graph showing spectral distribution of transmittance of the conventional TN mode liquid crystal apparatus of different thicknesses of the liquid crystal layers.
Figures 4, 5:
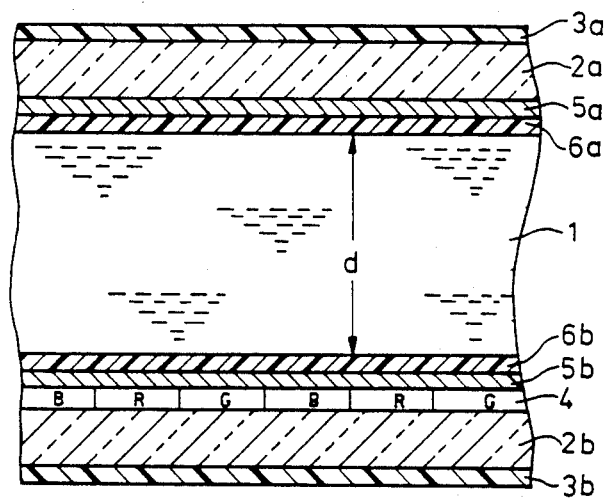
FIG. 4 is the schematic cross sectional view of the conventional color liquid crystal display apparatus.
FIG. 5 is a plan view showing a disposition of color filters of the conventional and general color liquid crystal display device.
Figure 17:
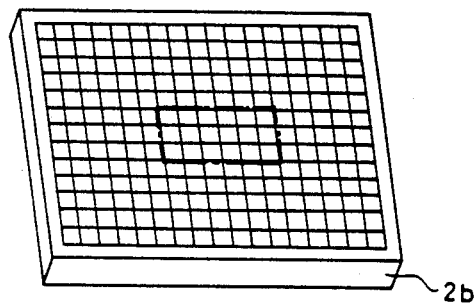
FIG. 17 is a perspective view schematically showing overall surface of the color filter substrate embodying the present invention in FIG. 16.
Figure 18:
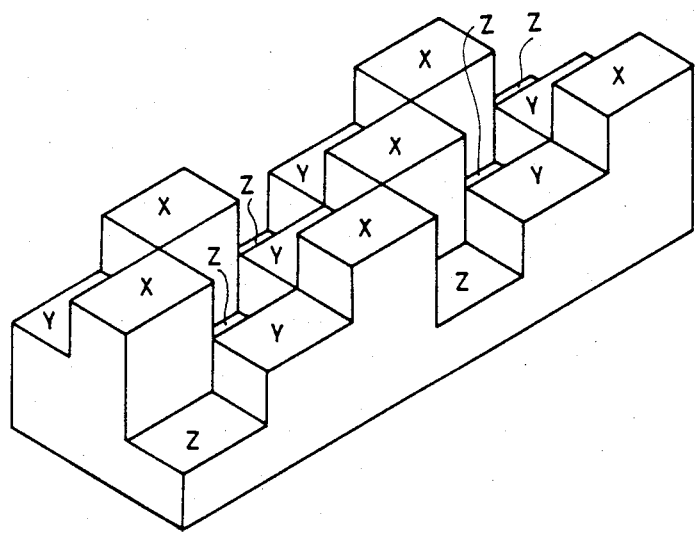
FIG. 18 is an enlarged perspective view showing detailed inner surface configuration of a part of a substrate shown by a chain line on FIG. 17.

In this example, a lower transparent substrate 2b has terraced surface having three levels formed in a predetermined pattern. FIG. 17 schematically shows perspective view of the lower substrate. A small part of the substrate is shown in enlarged size in FIG. 18. FIG. 18 is drawn by magnifying vertical size in about 100 times or more in order to show the terraced surfaces. The terraced transparent substrate 2b is made of a plastic material or glass and the terraced surface is formed by molding or by etching. In forming the color filter layer 4 on the terraced surface, B parts are formed on X-marked highest terrace, G parts are formed on Y-marked medium height and R parts are formed on Z-parts of lowest level. The plan view disposition of the color filter layer is, for instance as shown in FIG. 5. The forming of the color filter can be made by three times repetitions of coatings of organic materials, selective removal and dyeing. But other method, for instance printing, vapour deposition of pigment and electric field coating or other method may be used. In the actual substrate, the gap between the surfaces of the terraced of the substrate is at larget 1-2 $\mu$m, while length of the terrace is 100 times-1000 times, and therefore the transparent conductive film 5b and the alignment film 6b can be formed with continuity without any difficulty. Accordingly the alignment controlling of the liquid crystal has no difficulty.

EMBODIMENT 3

Figure 19:
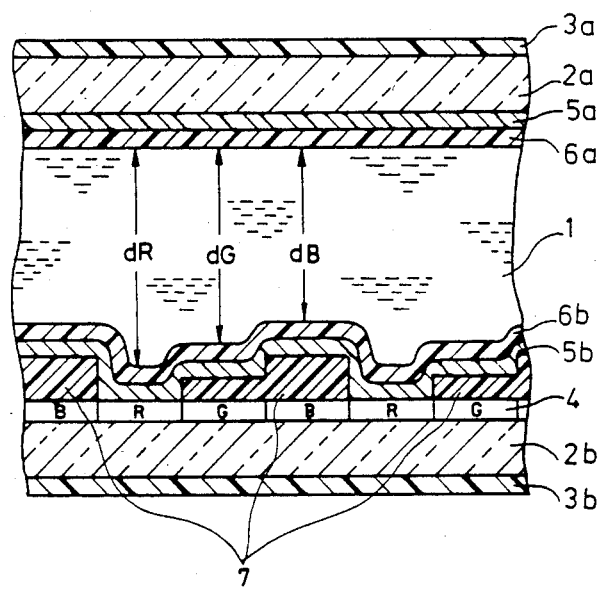
FIG. 19 is a sectional view schematically showing a cross section of a color liquid crystal display apparatus embodying the present invention wherein the liquid crystal layer has plural thicknesses by providing transparent layers of different thicknesses on different color filter element parts of color filter.

A third actual example is described with reference to FIG. 19. In this example, the color filter layer 4 is directly formed on the inner surface of the substrate 2b, and thereon transparent film 7 with different thicknesses is formed. Other parts and components and steps of forming are similar to the forgoing examples. The transparent film 7 is formed on the parts G and B of the color filter layer 4 and the parts on the B filter element parts are made thicker. In order to attain the $d_R$, $d_G$ and $d_B$ to be 5.4 μm, 4.8 μm and 3.7 μm, respectively, for instance the transparent film 7 on the G part is formed 0.6 μm while that on the B parts are 1.7 μm. As the material of the transparent film 7, a material having a good light transmittance in a visible light range (400-700 nm) and has a flat spectral transmittance characteristic is usable. Organic and inorganic material may be used. The coating is made by spinner coating, printing, vapour deposition or sputtering, and undesirable parts are selectively removed after forming. And by repeating the method, the above-mentioned transparent film having different thicknesses is made. The transparent film serves to realize the liquid crystal layer having optimum thicknesses. Therefore the transparent film 7 may be provided in other places, as shown in subsequent examples.

EMBODIMENT 4

Figure 20:
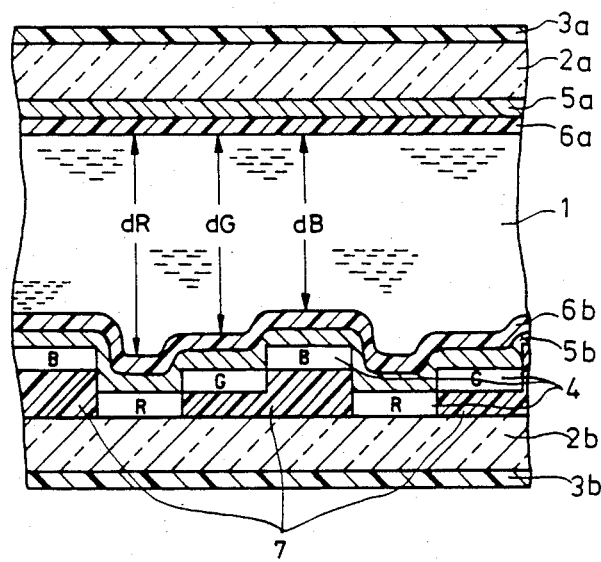
FIG. 20 is a cross sectional view schematically showing a cross section of a color liquid crystal display apparatus embodying the present invention wherein the liquid crystal layer has plural thicknesses by providing transparent layers of different thicknesses under different color element parts of color filter.

In FIG. 20, the transparent film having parts of different thicknesses corresponding to the parts of different colors of the color filter layer 4 is formed between the substrate 2b and the color filter layer 4. That is, between the G parts of the color filter 4 and the substrate 2b thinner parts of the transparent film 7 is formed. And between the blue parts of the color filter parts 4 and the substrate 2b, thicker parts of the transparent film 7 are formed. Other parts and components of the apparatus are similar to those of the forgoing examples.

EMBODIMENT 5

In the EXAMPLE 4, the transparent film 7 is provided on all the filter elements for, G and B parts with different thickness corresponding to the color of the filter elements. The transparent film 7 is formed on the color filter 4 and under transparent conductive film 5b. The thicknesses of the transparent film 7 is 0.1 μm, 0.7 μm and 1.8 μm for the parts on the R parts, G parts and B parts of the color filter layer 4. Other parts and components and making steps are similar to the forgoing examples.

EMBODIMENT 6

Figure 21:
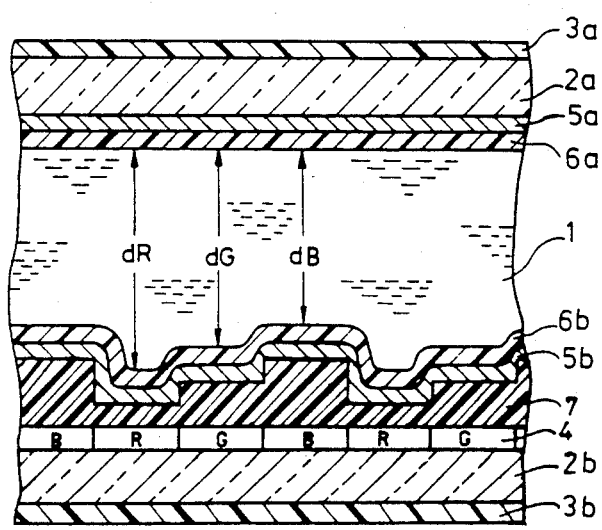
FIG. 21 is a cross sectional view schematically showing a cross section of a color liquid crystal display apparatus embodying the present invention wherein the liquid crystal layer has plural thicknesses by providing transparent layers of different thicknesses on different color element parts of color filter.
Figure 22:
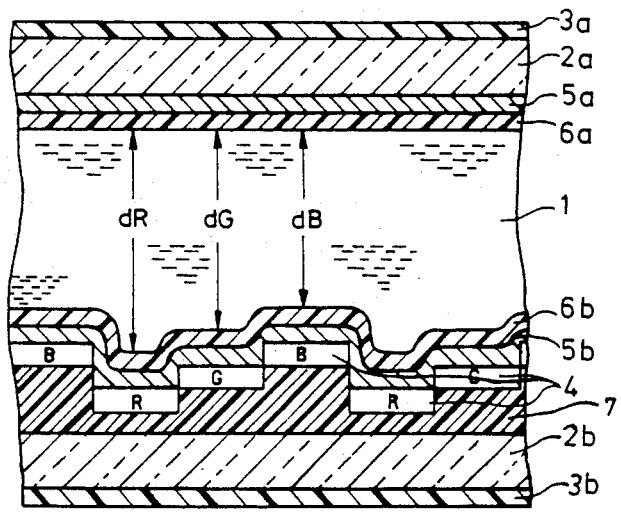
FIG. 22 is a cross sectional view schemtically showing a cross section of a color liquid crystal display apparatus embodying the present invention wherein the liquid crystal layer has plural thicknesses by providing transparent layers of different thicknesses under different color element parts of color filter.

FIG. 22 shows still another concrete example configuration wherein the transparent film 7 having different thicknesses for R parts, G parts and B parts of the color filter 4 is formed under the color filter 4 and on the substrate 2b. The relations of the thicknesses of the transparent film 7 is same as that of the example of FIG. 21.

In the examples of FIG. 20 and FIG. 22, the color filter layer 4 and the transparent 7 are not necessarily each other independent configuration. For instance, first the transparent film 7 with terraced surface is formed on the substrate 2b, the part corresponding to R filter elements are dyed by masking the parts to corresponds to G parts and B parts of the color filter layer 4, and then after masking the parts corresponding to the R parts and B parts the G color is dyed. And finally by masking the parts corresponding to R parts and G parts the B parts are dyed, thereby to form R, G and B dyed filter elements on the transparent film 7. In such making steps, as transparent film, preferably gelatin or the like organic film is appropriate.

MODE OF APPLICATIONS

As has been described in detail the difference to concrete configurations of many examples, embodiment is described on the case where the value u is selected to be or around $u=\sqrt{3}$ which is minimum value of u to give the transmittance T=0 in the equation (1), that is the case where optical path difference (d·Δn/λ) is compensated around the value of d of 5 μm in FIG. 8.

On the other hand, in FIG. 8 the transmittance of three colors become 0 at $d_G=10.7$ μm, $d_R=12$ μm and $d_B=12.7$ μm, and thickness difference of the liquid crystal layer thereat is fairly small. Accordingly the present invention is also applicable to the cases where $u=\sqrt{15}$, $\sqrt{35}$, . . . . In case the compensation of the liquid crystal layer thickness is made by the case of adopting the above-mentioned u value, the all of thicknesses of the depth of liquid crystal layer or the parts of R, G and B parts of the color filter layer become different from the above-mentioned example.

In the above-mentioned embodiment, the color filter layer is described to have three kinds colors R, G and B only, but color filter may be of other type having four colors or different combination of colors are usable to embodying the present invention. Though the color filter layer is formed on only one substrate in the above-mentioned embodiments, the color filter layer may be formed on both substrate. For instance, some color element(s) are formed on one substrate and other color element(s) are formed on the other substrate. In any cases, by selecting the thicknesses of the liquid crystal layer $d_R$, $d_G$ and $d_B$ in appropriate value in the rule described with reference to FIG. 14, the invention can be embodied.

The concept of the present invention can be applicable for all kinds of color liquid crystal display apparatus utilizing TN liquid crystal, and therefore, the pattern of the color filter and the corresponding electrodes and the corresponding thickness pattern are not limited to the above-mentioned check pattern matrix, but also may be any pattern. The present invention is of course applicable to the liquid crystal display apparatus wherein MOSFET, TFT (thin film transistor), MIM (metal insulator metal) diode or the like non-linear or active element may be formed on at least one substrate. Furthermore, the embodiment is not limited to the transparent type display apparatus but of course is applicable also to reflection type display apparatus.

In the description of some embodiment, the NB type is mainly described, but NW type is equally usable only by reversing the levels of the signal.

In the embodiment of the present invention, even though the thicknesses of the liquid crystal layer slightly shift to thicker direction or thinner direction, such shift induces only simultaneous increases or decreases of the thicknesses of the liquid crystal layer for R parts, G parts and B parts of the color filter from the ideal designed thicknesses. Such simultaneous shiftings of thicknesses do not induce large amount of light leaking at 0 volt impression nor drastic loss of white balance of the display, which have been taken place in the prior art apparatus. This is explained with reference to FIG. 23, which is a graph showing the relation between the thicknesses of liquid crystal layer and transmittances for R color light, G color light and B color light, and with reference to FIG. 8 for the relation between the uniform thickness of the liquid crystal layer and spectral transmittances for R, G and B lights.

Figure 23:
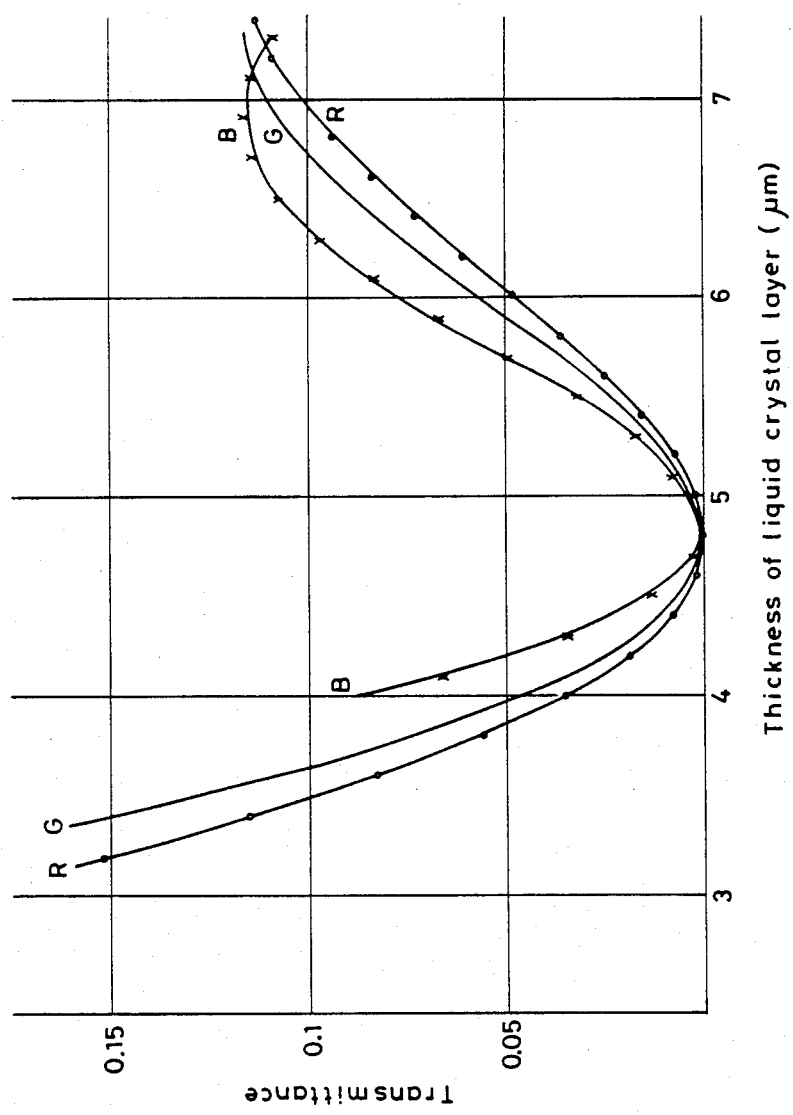
FIG. 23 is a graph showing a,relation between thicknesses of liquid crystal layer of green cell and transmittance of R, G and B lights.

In the conventional example of the liquid crystal color display apparatus having the uniform thickness, when the thickness is selected about 5.2 μm in the designing the transmittances for red light and green light are small and for blue light is large. In such conventional apparatus, when the thickness of the actually assembled apparatus becomes to 5.7 μm (by increasing 0.5 μm from the designed value), the transmittances for green color increases and for the blue color becomes maximum, thereby making the display panel more bluish. When the thickness of the assembled apparatus becomes to 4.7 μm (by decreasing 0.5 μm from the designed value), the transmittances for blue light decreases and for red light increases, thereby making the display panel reddish. Thus, the conventional apparatus undesirably changes color in a great extent by shift of the thickness of only 0.5 μm. Furthermore, such shifts of color for increase and decrease of the actual thickness from the designed value are in each other opposite directions of color. On the other hand, the curves of FIG. 23 show the effect of shifts of thicknesses from the designed thicknesses of the liquid crystal layer embodying the present invention to the transmittances. In the liquid crystal cell embodying the present invention, since the differences of thicknesses of the liquid crystal layer is given as the terraced inner surfaces of the substrate, the errors of thicknesses of actually assembled cell for the designed values are in the same directions (increases or decreases) and in the same errors of thickness. As is obvious from the curves of FIG. 23, at the central value $d_G = 4.8$ μm (at that time, $d_R = 5.4$ μm and $d_B = 3.8$ μm and transmittances for lights of the R, G and B all are zero), the transmittances for lights of all color becomes 0. When the thickness $d_G$ shifts by assembling error from this value to 5.3 μm (by increasing 0.5 μm from the designed value) or to 4.3 μm (by decreasing 0.5 μm from the designed value), in both cases the transmittances for R, G and B lights increase in the similar manner. Although the color becomes slightly whitish by such shifts (any directions of thicker or thinner), the increases of the transmittance in all colors are small, and that, differences of transmittances of R, G and B lights are small. Accordingly the white balance of the display by this liquid crystal cell is kept very good, thereby resulting in no substantial change of displayed color. Therefore, the liquid crystal cell embodying the present invention has a large tolerance for error of thicknesses in assembling. This is the very important fact and feature of the present invention.

EXPERIMENTS AND RESULTS

Figure 27:
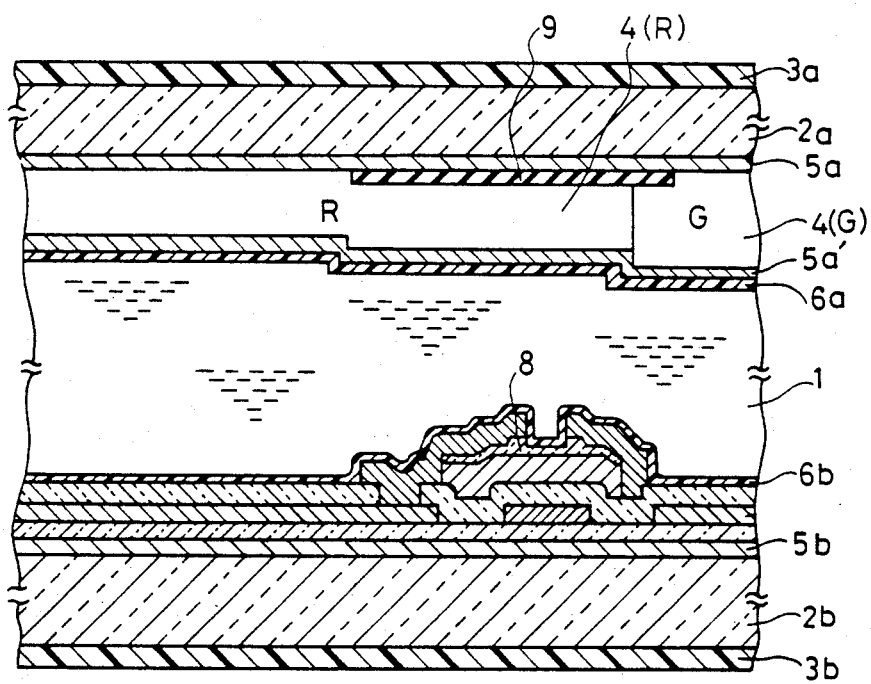
FIG. 27 is detailed cross sectional view of a-Si TFT-addressed liquid crystal full color display panel.
Figure 28:
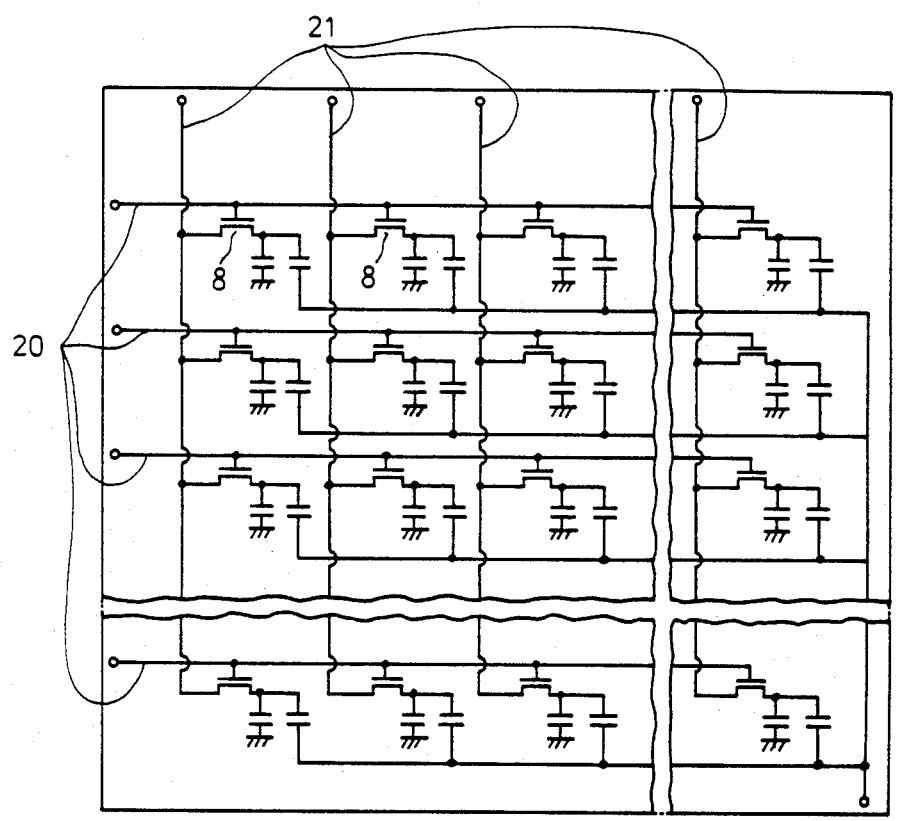
FIG. 28 is a circuit diagram of a-Si TFT-addressed liquid crystal full color display panel.

The inventors made a practical color liquid crystal display apparatus having liquid crystal layers with plural thicknesses for R, G and B parts of the color filter layer, combined with amorphous silicon (hereinafter abreviated as a-Si) TFT for application in an image display panel. Components of the image display panel such as TFT array, liquid crystal, poralizer, color filter layers, illumination system, electric circuit for imaging signal generation for operation of the image display panel, etc. have each particular characteristics or perculiar properties. Accordingly, the image display system should be designed and manufactured to achieve a high quality display as a combination of technology in the liquid crystal panel design, driving technology, etc. basing on the abovementioned characteristics and peculiar properties. Besides the aforementioned measures for simplifying the designing of the liquid crystal display panel, the inventors made trial manufacture of the actual display apparatus. Detailed cross sectional view and circuit diagram of a-Si TFT-addressed liquid crystal full color display panel is shown in FIGS. 27 and 28, respectively. The display panel comprises layer 4 of filter array and the a-Si TFT array as shown in FIG. 28 in the space between two substrate 2a and 2b to achieve an improvement of the display.

The outline of designing of the display apparatus is as follows. As has been described in detail, in an actual use with scattered light, the wavelengths of minimum transmission $\lambda_{min}$ for R, G and B lights and thicknesses of the crystal liquid layer at the parts on the color filter elements of the R, G and B colors, are not on the P-curve of FIG. 14, which corresponds to the case of $u = \sqrt{3}$ in the equation (1), but is represented by the S-curve. Provided that the display apparatus is illuminated by the aforementioned fluorescent lamp named PA-LOOK (trademark of Matsushita Electrics Corporation) having principal energy wavelengths of 610 nm, 545 nm and 450 nm for three primary color parts of light, through the inventor's experiments the depths of $d_R = 6.4$ μm, $d_G = 5.8$ μm and $d_B = 4.9$ μm are found to be preferable. Accordingly, the gap between the terrace surfaces of the terraced substrate of the display apparatus is $\Delta d_{RG} = 0.6$ μm, $\Delta d_{GB} = 0.9$ μm. On the inner surface of the glass substrate 2a, black stripes 9 are formed on the part between neighboring color filter element parts, where no image signal is impressed, in order to shield unnecessary lights, to improve the contrast and color purity. Furthermore, on the parts immediately above the TFT 8, light masking layer of light transmittance under 0.5% is formed to protect stable operation of the TFT 8.

The above-mentioned trial manufacture display apparatus was experimented. The gap between terraced surfaces of the substrate to give difference of thicknesses of the liquid crystal layer is measured by a surface roughness meter. Thickness of the liquid crystal layer 1 confined in the space between the substrate 2a having the filter layer 4 and the substrate 2b having the array of a-Si TFT 8 are measured by interference method. Response characteristics of applyed voltage vs transmittances is measured as follows. White light from a halogen lamp is applied through optical fibers and an optical diffusion plate disposed on one face of the display panel to illuminate the latter. An input voltage of the driver is impressed across gate buses 20 and source buses 21 of TFT's array illustrated in FIG. 28, thereby to simultaneously operate all the TFT's within 10 mm × 10 mm square area. Transmitted light through the display panel is received by light measuring optical fibers and guided to a photomultiplier. When a spectral characteristic is necessary, a band path filter having half width of 10 nm is inserted between the measuring optical fiber and the photomultiplier. The contrast is calculated as a ratio of the transmittance at impression of source voltage of 6 $V_{rms}$ and the transmittance of 0 V in this experiment, the transmitted lights are observed in a direction vertical to the display panel. The filter used in this experiment has the surface gap of $\Delta d_{RG} = 0.9$ μm and $\Delta d_{BG} = 0.6$ μm. The designed ideal gap between R and G parts is 0.6 μm and the designed ideal gap between the G and B parts is 0.9 μm.

Operation characteristics of the above-mentioned experimental apparatus are as follows.

Figure 24:
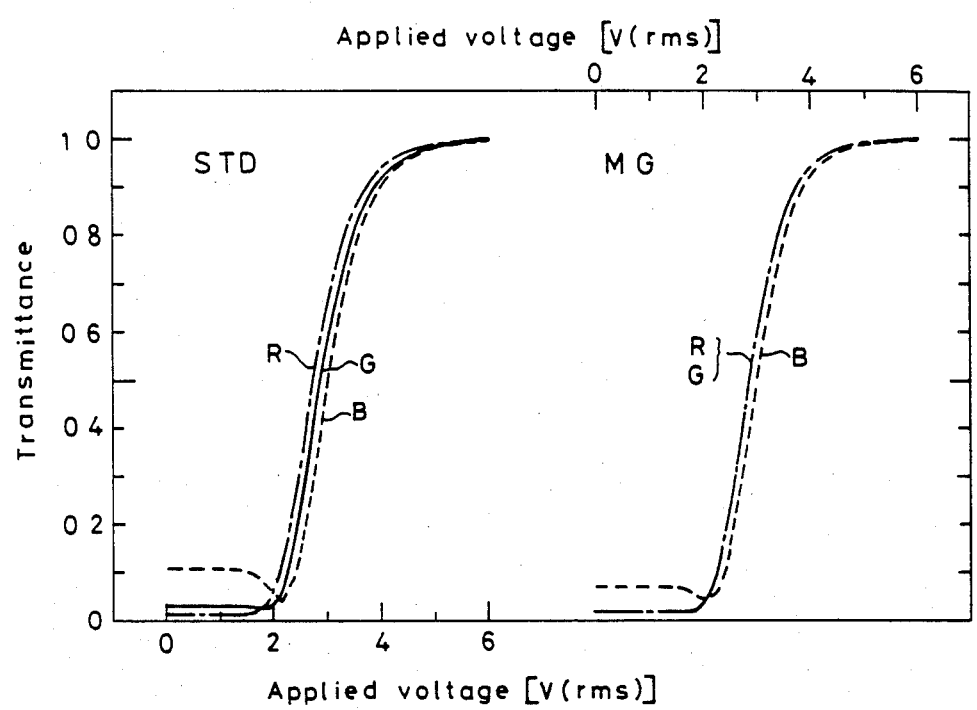
FIG. 24 is a graph showing a relation between applied voltage and transmittance of the apparatus embodying the present invention (curves designated MG.) and though of a comparison example (curves designated STD.)
Figure 25:
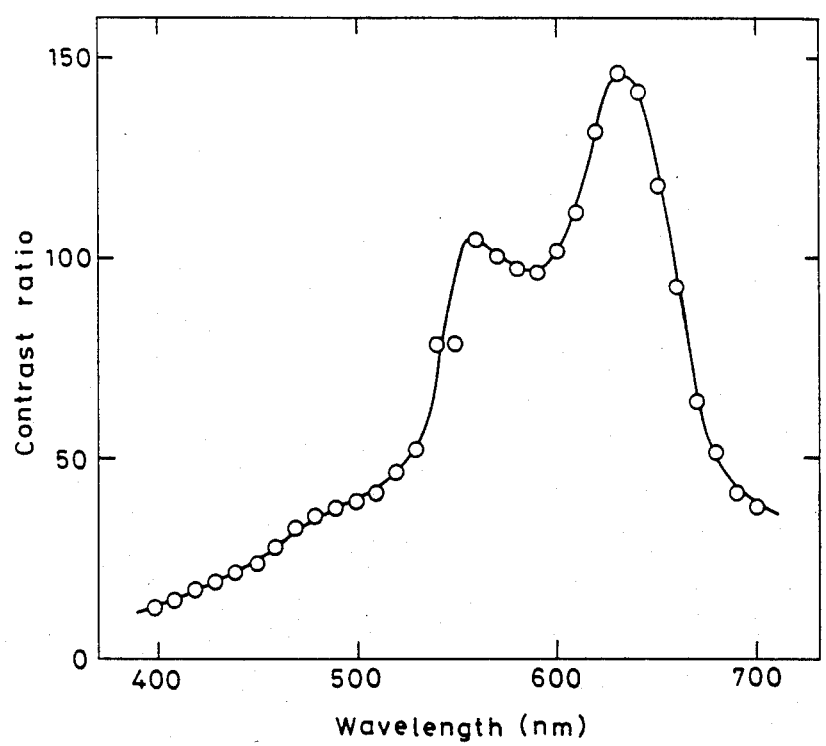
FIG. 25 is a graph showing spectral distribution of contrast ratio of a color liquid crystal display apparatus embodying the present invention.

The above-mentioned color liquid crystal display apparatus comprises array of the TFT 8 of FIG. 28 consisting of 252 × 240 unit circuits corresponding to the picture elements, and a 2.4 inch diagonal size display panel combined with the above-mentioned color filter layer with plural depths is driven by AC voltage impression. The characteristic curve of input signal vs transmittance is shown in FIG. 24. Apart from the conventional comparison example shown in the curves STD wherein d is uniformly 6.2 μm, hence showing bluish color at 0 volt impression due to difference of the transmittances of three primary colors, the display apparatus of the abovementioned experiment shows the characteristic shown by the curves MG of FIG. 24, wherein $d_R = 6.62$ μm, $d_G = 5.74$ μm and $d_B = 5.14$ μm. And the characteristic curves of red (610 nm) and green (550 nm) agree each other, and only blue (450 nm) shows slightly different characteristic. In this apparatus, rise time and fall time, which is of the light at room temperature and at impression of voltage to make the transmittances of about 50% of saturation value, are about 50 msec and about 30 msec, respectively. Difference between response times for three colors induced by the gap differences is subject to $d^2$-law. Though such differences of response time slightly make coloring of fast moving parts on display panel, the coloring is moderate and negligible. Nextly, the contrast of the displayed images are shown in FIG. 25. As shown in FIG. 25, the contrast is above 30 for all range of the wavelengths of 460 nm to 700 nm. Especially, at the wavelengths of 630 nm and 560 nm, the relation between the thickness d and the wavelength of minimum transmission $\lambda_{min}$ are well agreeing on the curve S of FIG. 14. Accordingly the contrast is above 100. For blue color the contrast is relatively small. This is considered due to leaking of blue color light from the red filter. It is also considered that the reason of lowering aparent blue color contrast is due to simultaneous switching of picture elements of all colors of the liquid crystal.

Figure 26:
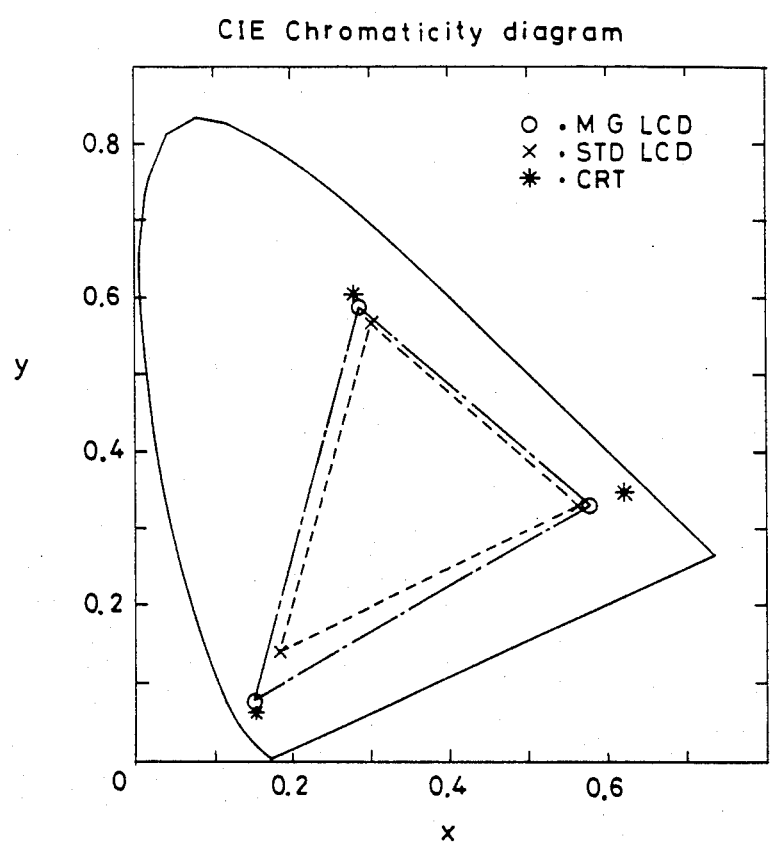
FIG. 26 is a CIE chromaticity diagram showing range of color reproductions of a color liquid crystal display apparatus embodying the present invention and a comparison color liquid crystal display apparatus of the prior art and a conventional color cathode ray tube.

The color reproducibilities are comparatively shown for the conventional liquid crystal display apparatus having uniform thickness $d = 6.2$ μm by the curves STD, for the embodiment of the present invention with plural thicknesses of liquid crystal layer shown by the curves MG and for the conventional CRT, in a CIE chromaticity diagram of FIG. 26. As shown from the diagram, by providing multiple thicknesses in the liquid crystal layer, the range of reproduced color is considerably enlarged. And the reproduced color range is substantially the same with the current CRT except red.

For color balance, unlike from the conventional liquid crystal display panel, the present display panel can represent good natural colors without voltage compensation.

As is described above, the actual application experiments show that the present invention can increase contrast and range of color reproduction and color balance.

What is claimed is:

1. A color liquid crystal display apparatus comprising:
   a cell having two substrates forming a closed space therebetween, at least one of said two sheets being transparent, said closed space having many minute parts of different gaps,
   a plural of color filters of different spectral transmittance characteristics corresponding to said many minute parts of different gaps, formed on at least one of said two substrates,
   electrodes formed on said substrate for selective impressing of potentials across gaps of said cell, and
   a liquid crystal layer confined in said closed space thereby having different thicknesses corresponding to different kinds of said color filters.

2. A color liquid crystal display apparatus in accordance with claim 1, wherein
   said color filters comprise three kind ones respectively consisting of spectral transmittance characteristics for mainly passing red light, green light and blue light.

3. A color liquid crystal display apparatus in accordance with claim 2, wherein thicknesses of the liquid crystal layer are largest for the parts corresponding to the color filters to pass red light, medium for those to pass green light and smallest for those to pass blue light.

4. A color liquid crystal display apparatus in accordance with claim 1, 2 or 3, wherein said color filters are provided on the inner surface of one of said substrate.

5. A color liquid crystal display apparatus in accordance with claim 1, 2 or 3, wherein said electrodes are transparent and provide on the inner surface of one of said substrate.

6. A color liquid crystal display apparatus in accordance with claim 2 or 3, wherein said color filters have different thicknesses respectively for said three different kind ones.

7. A color liquid crystal display apparatus in accordance with claim 1, wherein at least one of said substrate has terraced surface having minute surfaces of different levels on the surface disposed at a predetermined pattern.

8. A color liquid crystal display apparatus in accordance with claim 7, wherein
   said color filters comprise three kind ones respectively consisting of spectral transmittance characteristics for mainly passing red light, green light and blue light.

9. A color liquid crystal display apparatus in accordance with claim 8, wherein thicknesses of the liquid crystal layer are largest for the parts corresponding to the color filters to pass red light, medium for those to pass green light and smallest for those to pass blue light.

10. A color liquid crystal display apparatus in accordance with claim 8 or 9, wherein said color filters are provided on the inner surface of one of said substrate.

11. A color liquid crystal display apparatus in accordance with claim 7, 8 or 9, wherein said electrodes are transparent and provide on the inner surface of one of said substrate.

12. A color liquid crystal display apparatus in accordance with claim 8 or 9, wherein said terraced surfaces comprise red, green and blue color filters for respective levels of surfaces.

13. A color liquid crystal display apparatus in accordance with claim 12, wherein levels of said surfaces for red, green and blue are different from each other.

14. A color liquid crystal display apparatus in accordance with claim 1, wherein a transparent film is provided in a superposed relation with at least one kind of color filters.

15. A color liquid crystal display apparatus in accordance with claim 14, wherein
   said color filters comprise three kind ones respectively consisting of spectral transmittance characteristics for mainly passing red light, green light and blue light.

16. A color liquid crystal display apparatus in accordance with claim 15, wherein said color filters are provided on the inner surface of one of said substrate.

17. A color liquid crystal display apparatus in accordance with claim 16, wherein said color filters are provided on the inner surface of one of said substrate.

18. A color liquid crystal display apparatus in accordance with claim 14, 15, 16 or 17, wherein said electrodes are transparent and provide on the inner surface of one of said substrate.

19. A color liquid crystal display apparatus in accordance with claim 15, 16, or 17, wherein said transparent film is provided on first color filters for mainly passing green light and on second color filters for mainly passing blue light, and thicknesses of said first color filters and second color filters are different each other.

20. A color liquid crystal display apparatus in accordance with claim 15, 16, or 17, wherein said transparent film is provided on color filters for mainly passing red light, those for green light and those for blue light, with different thicknesses for different color filters.

21. A color liquid crystal display apparatus in accordance with claim 2, or 8, wherein said apparatus is illuminated by a white light source having a spectral radiation characteristic, which is analogous to line spectrum characteristic in the lights of red, green and blue.

* * * * *